United States Patent
Wang et al.

(10) Patent No.: US 10,042,080 B2
(45) Date of Patent: Aug. 7, 2018

(54) X-RAY SCANNING METHOD AND SYSTEM

(71) Applicant: Nuctech Company Limited, Beijing (CN)

(72) Inventors: Qiang Wang, Beijing (CN); Jing Ma, Beijing (CN); Zhongrong Yang, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 169 days.

(21) Appl. No.: 15/061,854

(22) Filed: Mar. 4, 2016

(65) Prior Publication Data

US 2016/0299250 A1    Oct. 13, 2016

(30) Foreign Application Priority Data

Apr. 7, 2015    (CN) .......................... 2015 1 0162286

(51) Int. Cl.
| | | |
|---|---|---|
| *G01D 18/00* | (2006.01) | |
| *G01V 5/00* | (2006.01) | |
| *G01T 1/29* | (2006.01) | |

(52) U.S. Cl.
CPC .......... *G01V 5/0016* (2013.01); *G01T 1/2985* (2013.01)

(58) Field of Classification Search
CPC .... G01V 5/0016; H04N 5/3205; G01N 23/04; G01T 1/2985
See application file for complete search history.

(56) References Cited

U.S. PATENT DOCUMENTS

| | | | |
|---|---|---|---|
| 5,949,842 | A  | 9/1999  | Schafer et al. |
| 6,459,761 | B1 | 10/2002 | Grodzins et al. |
| 7,551,715 | B2 | 6/2009  | Rothschild et al. |

FOREIGN PATENT DOCUMENTS

| | | |
|---|---|---|
| CN | 1276870    | 12/2000 |
| CN | 101672805  | 3/2010 |
| CN | 102567960  | * 12/2010 |
| CN | 102567960  | 7/2012 |
| CN | 102567960 A | 7/2012 |
| CN | 204495747  | 7/2015 |

(Continued)

OTHER PUBLICATIONS

Machine Translation (specification) of CN 102567960.*

(Continued)

*Primary Examiner* — Courtney Thomas
(74) *Attorney, Agent, or Firm* — Knobbe Martens Olson and Bear LLP (57) ABSTRACT

X-ray scanning methods and systems are provided in embodiments of the present inventions. According to one illustrative implementation, an exemplary method may comprise: collecting background data when no X-ray is emitted; collecting air data when X-rays are emitted and there is no object to be scanned in an inspection channel; scanning an object to collect original scanning data; and preprocessing the original scanning data according to the background data and the air data to acquire scanned image data. In some embodiments, when performing an X-ray scanning of a static object, implementations may measure the background data and the air data and process the scanning data, thereby solving noise issues caused by mechanical vibration and thus improving the measurement accuracy.

20 Claims, 6 Drawing Sheets

(56) References Cited

FOREIGN PATENT DOCUMENTS

| RU | 2261465 | 9/2005 |
|---|---|---|
| RU | 2418291 | 5/2011 |
| WO | WO 92/02892 | 2/1992 |
| WO | WO 1992/002892 A1 | 2/1992 |
| WO | WO 99/19716 | 4/1999 |
| WO | WO 2016/147314 A1 | 9/2016 |

OTHER PUBLICATIONS

European Search Report dated Aug. 24, 2016 in Application No. 16158305.9; 4 pages.
Examination reported dated Nov. 15, 2016 in Australian Application No. 2016201324; 3 pages.
Office Action dated Nov. 1, 2016 in Japanese Application No. 2016-044778 (2 pgs), and English-language translation thereof (1 pg); 3 pages total.
Office Action and First Search Report dated Feb. 21, 2017, received in Chinese Patent Application No. 2015101622868 (7 pgs), as well as concise English-language explanation of same (1 pg); 8 pages total.
Office Action dated May 10, 2017, received in Russian Patent Application No. 2016110461 (6 pgs), as well as English-language translation/summary of same (2 pgs); 8 pages total.

* cited by examiner

X-RAY SCANNING METHOD AND SYSTEM

CROSS-REFERENCE TO RELATED APPLICATIONS

This application is based upon and claims priority to Chinese Patent Application No. 201510162286.8 filed on Apr. 7, 2015, the entire contents of which are incorporated herein by reference.

BACKGROUND

Technical Field

The present invention relates to a field of radiation detection, and more specifically to an X-ray scanning method and system.

Description of Related Information

X-ray scanning and imaging techniques have been commonly utilized in various industries such as security inspection, industrial radiography, medical examination, etc. Specifically, X-ray security inspection equipment has been widely used in various places such as stations, ports, airports, convention centers, etc. In most X-ray scanning systems, the scanning process is performed in such a way that a plane of emitted X-ray beams remains stationary and a delivery system moves an object to be inspected through the plane of emitted X-ray beams. However, in some situations, the object to be inspected is unsuitable for being moved. For example, the object to be inspected may be a fixed industrial device; or in a human-body inspection, it is not easy for a person to keep balance when he/she moves. In this case, in order to perform the scanning process, the scanning system has to move the plane of emitted X-ray beams. Therefore, there is a need for an imaging system in which, when an object to be inspected remains stationary, an X-ray scanning apparatus can move a plane of emitted X-ray beams such that a scanning process may be performed.

Figure 1:
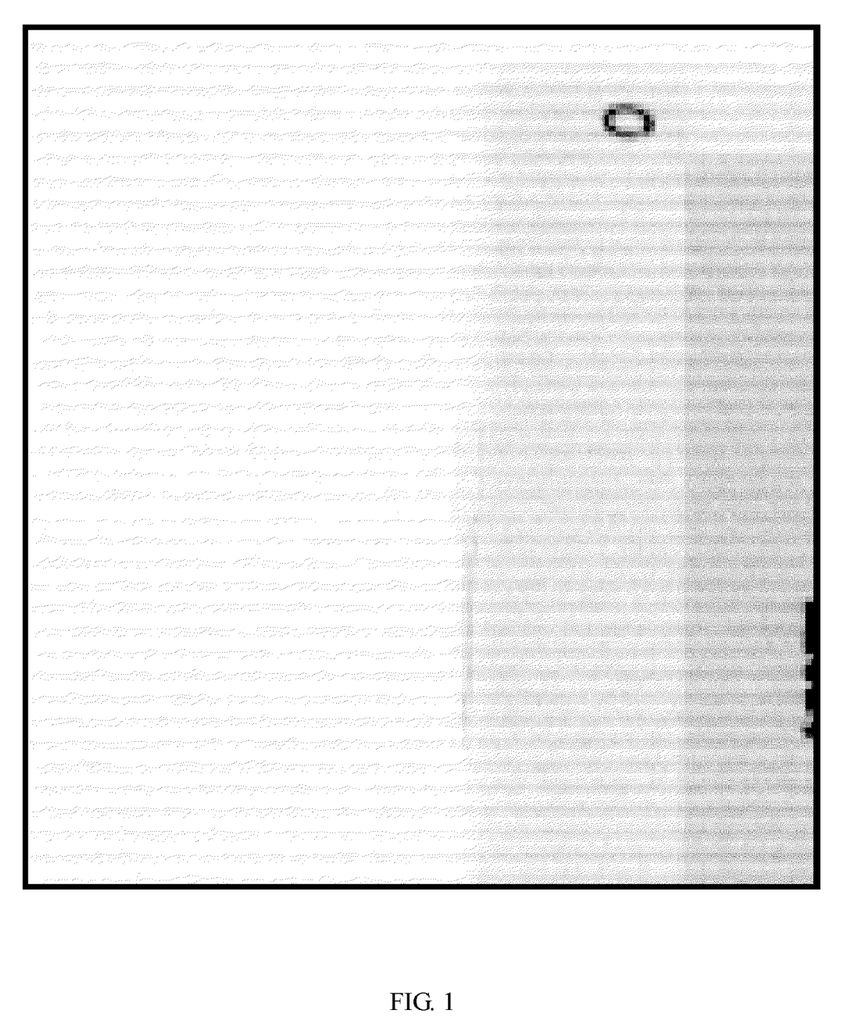
FIG. 1 is an exemplary diagram of stripe noise generated in the prior art.

When an object to be inspected remains stationary and a plane of emitted X-ray beams is moved, since inevitable vibration occurs during motion of certain components, an X-ray generator cannot remain at rest relative to a detector during the scanning process. This may lead to an unstable intensity of X-rays received by the detector. In this case, if traditional correction approaches are employed to process an acquired image (comprising for example simple data transmission, noise reduction processing and analysis, as commonly used), stripe noise will inevitably occur in the image, as shown in FIG. 1.

Overview

Aspects of the present innovations provide X-ray scanning methods and systems to solve the noise issue in the prior art, which is caused by mechanical vibration in existing X-ray scanning process for static object.

To solve the above problems, the present innovations may provide an X-ray scanning method, comprising:
 collecting background data when no X-ray is emitted;
 collecting air data when X-rays are emitted and there is no object to be scanned in an inspection channel;
 scanning an object to collect original scanning data; and
 preprocessing the original scanning data according to the background data and the air data to acquire scanned image data.

In some implementations, the step of collecting the background data may further comprise averaging the background data to acquire averaged background data.

According to certain implementations, the step of collecting the air data may further comprise averaging the air data to acquire averaged air data.

In various implementations, the step of preprocessing the original scanning data according to the background data and the air data to acquire scanned image data may further comprise:
 segmenting a scanning region into an object region containing therein the object and an air region without the object according to the original scanning data; and
 searching the air data for particular air data closest to a value of original scanning data for the air region, and performing a gain correction for the original scanning data according to the background data and the closest air data to acquire the scanned image data.

In further implementations, the step of segmenting the scanning region into the object region containing therein the object and the air region without the object according to the original scanning data may comprise segmenting the scanning region into the object region containing therein the object and the air region without the object by using a predefined threshold.

In other implementations, the step of segmenting the scanning region into the object region containing therein the object and the air region without the object according to the original scanning data may also comprise segmenting the scanning region into the object region containing therein the object and the air region without the object by using a thresholding method, an edge detection method, or a region growing method.

In still other implementations, the step of preprocessing the original scanning data according to the background data and the air data to acquire scanned image data may further comprise:
 defining a sub-region of the scanning region in which no object is allowed to be placed as the air region, and defining the rest of the scanning region as the object region; and
 searching the air data for particular air data closest to a value of original scanning data for the air region, and performing a gain correction for the original scanning data according to the background data and the closest air data to acquire the scanned image data.

According to other aspects, the present innovations may also provide an X-ray scanning system, comprising:
 an X-ray generator, adapted for emitting X-rays;
 a detector that remains stationary relative to the X-ray generator, adapted for collecting detecting signals of the X-rays; and
 a processor coupled to the detector, adapted for processing the detecting signals of the X-rays that are collected by the detector, wherein the processing may comprise:
 employing the detecting signals collected by the detector when the X-ray generator emits no X-ray as background data;
 employing the detecting signals collected by the detector when the X-ray generator emits the X-rays and there is no object to be scanned in an inspection channel as air data;
 employing the detecting signals collected by the detector when the X-ray generator emits the X-rays to scan an object as original scanning data; and
 preprocessing the original scanning data according to the background data and the air data to acquire scanned image data.

In various implementations herein, the processor may further be adapted for:

averaging the background data to acquire averaged background data; and/or averaging the air data to acquire averaged air data.

According to certain implementations, illustrative systems may further comprise a collimator, which is fixed in an optical path between the X-ray generator and the detector, wherein the collimator remains stationary relative to both the X-ray generator and the detector, adapted for collimating the X-rays emitted by the X-ray generator.

In some implementations, the processor may further be adapted for:

segmenting a scanning region into an object region containing therein the object and an air region without the object according to the original scanning data; and searching the air data for particular air data closest to a value of original scanning data for the air region, and performing a gain correction for the original scanning data according to the background data and the closest air data to acquire the scanned image data.

According to certain implementations, the processor may be further adapted for segmenting the scanning region into the object region containing therein the object and the air region without the object by using a predefined threshold.

In other implementations, the processor may be further adapted for segmenting the scanning region into the object region containing therein the object and the air region without the object by using a thresholding method, an edge detection method, or a region growing method.

In still other implementations, the processor is further adapted for:

defining a sub-region of the scanning region in which no object is allowed to be placed as the air region, and defining the rest of the scanning region as the object region; and searching the air data for particular air data closest to a value of original scanning data for the air region, and performing a gain correction for the original scanning data according to the background data and the closest air data to acquire the scanned image data.

As such, when performing an X-ray scanning for a static object, the X-ray scanning method and scanning system according to the embodiments of the present innovations may measure the background data and the air data and process the scanning data, thereby solving the noise problem caused by the mechanical vibration and thus improving the measurement accuracy.

DESCRIPTION OF THE DRAWINGS

To illustrate the technical solutions in the embodiments of the present invention or the prior art more clearly, the following briefly introduces the accompanying drawings required for describing the embodiments of the invention or the prior art. Apparently, the accompanying drawings in the following description show merely some embodiments of the present invention, and persons of ordinary skill in the art may still derive other drawings from these accompanying drawings without innovative efforts.

DETAILED DESCRIPTION

In order to make objects, technical solutions and advantages of the embodiments of the present inventions more apparent, the technical solutions of the embodiments of the present invention will be described in a clearly and fully understandable way in connection with drawings related to certain embodiments of the present invention. The implementations described herein form just a part, though not all, of the embodiments of the inventions herein. Based on the described embodiments herein, those skilled in the art may ascertain other embodiment(s), without any inventive work, which may be within the scope of the present inventions.

Figure 2:
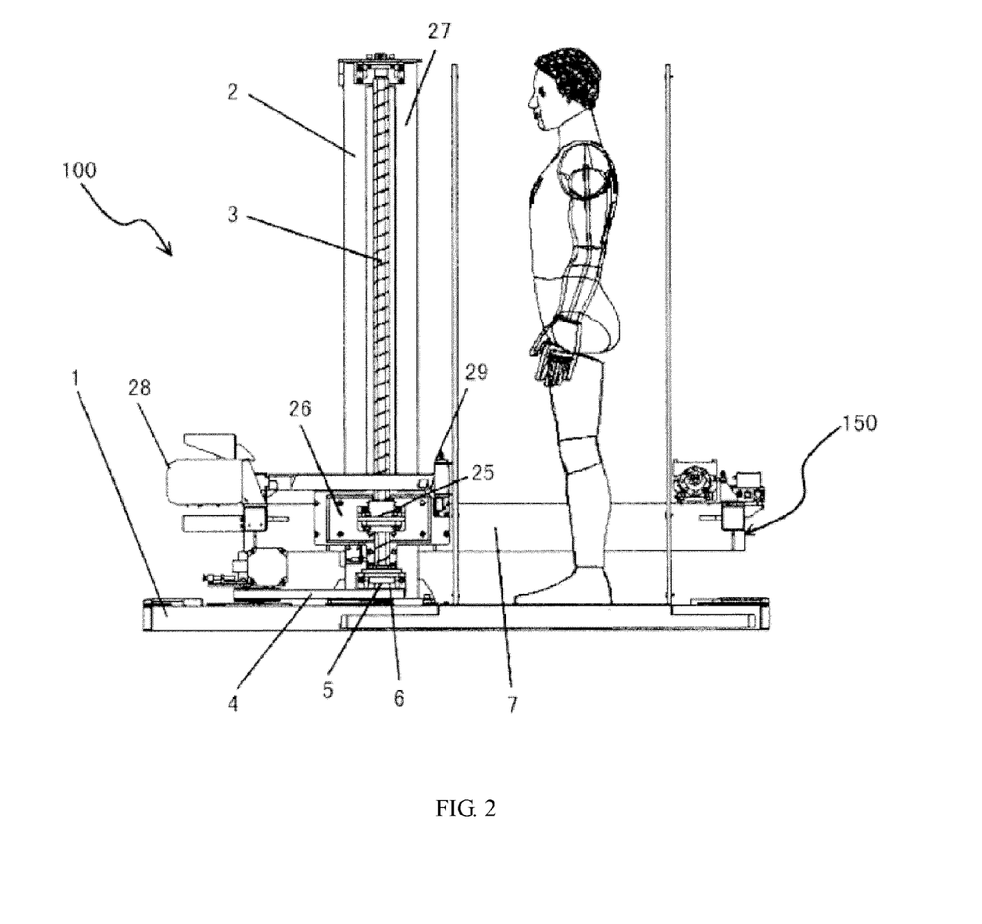
FIG. 2 is a structural diagram of a human-body security inspection system.

FIG. 2 shows a human-body security inspection system which may move a plane of emitted X-ray beams while an object to be inspected remains stationary. The system comprises: a pedestal 1, a post 2 supported on the pedestal 1, a collimator mounting face 3, a synchronous belt 4, synchronous pulleys 5, a bearing block 6, an integral arm 7, a nut 25, a slider 26, a guide rail 27, an electric motor 28 and a collimator adjusting device 29, and a scanning and imaging apparatus 150 that is drivable and connected to the post 2. The human-body security inspection system may comprise a driving device 100 for driving the scanning and imaging apparatus 150 to move along a predetermined direction (such as a vertical direction as shown in FIG. 2) so as to perform the scanning process. In FIG. 2, an X-ray source, a collimator and a detector of the scanning and imaging apparatus 150 are fixedly connected to each other through the integral arm 7 so as to form an integrated structure.

Figure 3:
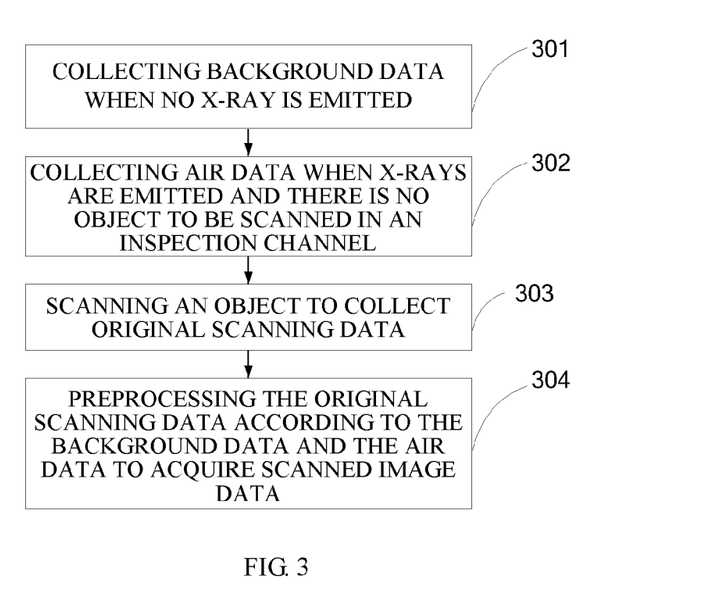
FIG. 3 is a basic flow diagram of an X-ray scanning method in accordance with embodiments of the present invention.

Referring to FIG. 3, an X-ray scanning method is provided in accordance with the embodiment of the present invention, which comprises:

Step 301: collecting background data when no X-ray is emitted;

Step 302: collecting air data when X-rays are emitted and there is no object to be scanned in an inspection channel;

Step 303: scanning an object to collect original scanning data; and

Step 304: preprocessing the original scanning data according to the background data and the air data to acquire scanned image data.

Furthermore, in the step of collecting the air data when X-rays are emitted and there is no object to be scanned in an inspection channel, an X-ray generator, a detector and the plane of X-ray beams emitted from the X-ray generator are moving during the scanning process.

In order to have a more accurate measurement, the collected background data and/or air data may be averaged. Preferably, the method may comprise: averaging the background data to acquire averaged background data, or averaging the air data to acquire averaged air data.

In some implementations, the step of preprocessing the original scanning data according to the background data and the air data to acquire scanned image data may further comprise:

segmenting a scanning region into an object region containing therein the object and an air region without the object according to the original scanning data; and searching the air data for particular air data closest to a value of original scanning data for the air region, and performing a gain correction for the original scanning data according to the background data and the closest air data to acquire the scanned image data.

According to certain implementations, the step of segmenting the scanning region into the object region containing therein the object and the air region without the object according to the original scanning data may comprise segmenting the scanning region into the object region containing therein the object and the air region without the object by using a predefined threshold.

In various implementations, the step of segmenting the scanning region into the object region containing therein the object and the air region without the object according to the original scanning data may also comprise segmenting the scanning region into the object region containing therein the object and the air region without the object by using a thresholding method, an edge detection method, or a region growing method.

Further, a thresholding method may be used to distinguish the gray level thresholds of target (i.e., the object region) and background (i.e., the air region). If an image only comprises target and background, the method may select a single threshold, also known as single threshold segmentation. Segmentation using a predefined threshold is one kind of single threshold segmentations. The edge detection method is the most popular detection method for gray level discontinuity. This method is based on the original scanning data and uses a first-order derivative and/or a second-order derivative to detect the gray level discontinuity of the image, such that the object region and the air region of the image may be segmented. Basic principle of the region growing method is to gather pixels with similar property to construct a region. It begins with choosing a seed point (i.e., a seed pixel), and subsequently merging similar pixels around the seed pixel into a region containing the seed pixel. As a result, the object region and the air region of the original scanning data may be obtained respectively.

In some implementations, the step of preprocessing the original scanning data according to the background data and the air data to acquire scanned image data may further comprise:

defining a sub-region of the scanning region in which no object is allowed to be placed as the air region, and defining the rest of the scanning region as the object region; and searching the air data for particular air data closest to a value of original scanning data for the air region, and performing a gain correction for the original scanning data according to the background data and the closest air data to acquire the scanned image data.

EXAMPLE 1

Example 1 consistent with one or more aspects of the present inventions provides an X-ray scanning method, which is adapted for human-body scanning. In a case where a plane of emitted X-ray beams is fixed while a person to be inspected passes through the plane of emitted X-ray beams by standing on a conveying belt, since it is not easy for the person to keep balance when he/she moves, his/her body-shaking will impact the inspection effect. Therefore, in a scanning process of the Example 1, the person to be inspected stands on a designated fixed location, and the scanning process is performed by moving an X-ray generator and a detector (their relative position is fixed) in a direction vertical to the plane of emitted X-ray beams. During this scanning process, the only thing to do by the person to be inspected is to keep still.

Figure 4:
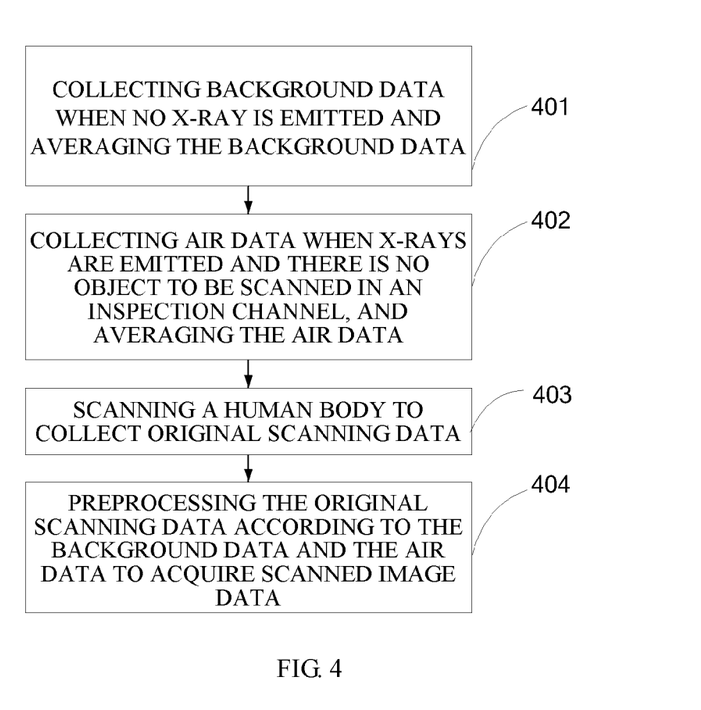
FIG. 4 is a flow diagram of an X-ray human-body scanning method in accordance with Example 1 of the present invention.

With regard to an illustrative implementation, referring to FIG. 4, in order to correct stripe noise (which is caused by mechanical vibration during the scanning process) on images, the scanning method of Example 1 of the present invention may comprise:

Step 401: collecting background data when no X-ray is emitted and averaging the background data.

In this step, the background data is collected when no X-ray is emitted. Because no X-ray will be generated during the collection of the background data, the problem that the X-rays received by the detector have the unstable intensity due to the mechanical vibration during the scanning process will not arise.

During the collection of the background data collection, the background data may be collected for a period of time and then averaged. Averaged background data is denoted by Z(j), wherein j=1, . . . , n, and j represents a serial number of a channel of the detector.

Step 402: collecting air data when X-rays are emitted and there is no object to be scanned in an inspection channel, and averaging the air data.

In this step, the air data is collected when the X-rays are emitted and there is no object to be scanned in the inspection channel. The air data obtained by scanning will be used in a gain correction for the detector. Since mechanical vibration occurs during the scanning process, the air data will have a large fluctuation. During this collection, the X-ray generator and the detector move in a direction vertical to the plane of emitted X-ray beams to perform a no-object scanning, i.e., there is no object placed in the scanning channel. As a result, a set of air data F(i, j) will be obtained, wherein i=1, . . . , m, and j=1, . . . , n. Furthermore, "i" represents a serial number of a sampling time, and there are m rows of data obtained during the scanning process; and "j" represents a serial number of a channel of the detector, and there are n detector channels in total. Moreover, m and n may also represent a height and a width of the scanned image, respectively.

Thereafter, the obtained air data F(i, j) may be averaged over all the rows, which results in averaged air data $F(j) = \Sigma_{i=1}^{m} F(i, j)/n$.

Step 403: scanning a human body to collect original scanning data.

In this step, the original scanning data is collected by moving the X-ray generator and the detector to perform a normal scanning for the human body that remains stationary. The original data obtained during the scanning process for the human body is denoted by R(i, j), wherein i=1, . . . , m, and j=1, . . . , n.

Step 404: preprocessing the original scanning data according to the background data and the air data to acquire scanned image data.

Background correction and gain correction (i.e., data preprocessing) will be performed for the obtained original scanning data according to the averaged background data and the averaged air data. The preprocessed image is denoted by N(i, j). The calculation of N(i, j) will be explained in detail as below.

First, the original scanning data is preprocessed according to the averaged background data and the averaged air data. Particularly, for each sampling time i, T(i, j) will be calculated according to the following equation:

$$T(i, j) = \frac{R(i, j) - Z(j)}{F(j) - Z(j)} \times GAMX \times a + b$$

wherein, GMAX is the maximum gray level that can be represented by the scanned image, a and b are configurable constants, which depend on actual scanning situations. In fact, this is an ordinary preprocessing method for original data, and there may be obvious transverse stripes in the obtained scanned image T(i, j).

Figure 5:
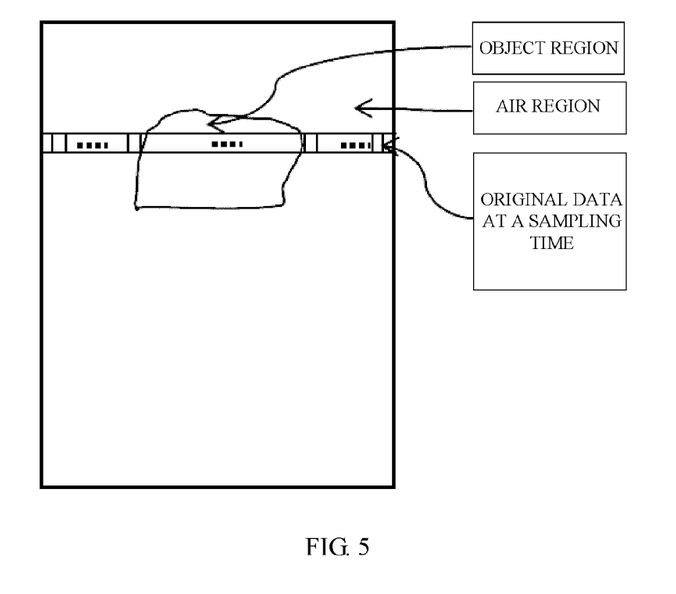
FIG. 5 is an exemplary diagram of a segmentation of object region and air region in accordance with Example 1 of the present invention.

On the basis of T(i, j), for the original scanning data obtained at each sampling time, the acquired scanned image may be segmented into an object region containing therein the human body and an air region without the human body (referring to FIG. 5).

The region segmentation may simply employ a predefined threshold t. Particularly, regions whose values are larger than t are defined as air region, and regions whose values are no larger than t are defined as object region. Alternatively, any other image segmentation methods may be employed, such as thresholding method, edge detection method, region growing method, etc. For each row i, a set of column coordinates of the corresponding air region may be denoted by $A_i$. That is to say, during the scanning of the i-th row of the original scanning data, there is no object in these columns in the set $A_i$ to absorb the X-rays. Therefore, the corresponding scanning data for these columns shall be regarded as air data as a result of scanning the air. For these columns in the set $A_i$, a row $k_i$ which is closest to the value of original scanning data is searched from the air data F(i, j):

$$k_i = \underset{0 \leq s \leq 1}{\operatorname{argmin}} \sqrt{\sum_{r \in A_i} (R(i, r) - F(s, r))^2}.$$

For the set $A_i$ of columns of the air data, the value of the i-th row of the original scanning data is closest to the value of the $k_i$-th row of the air data. In the presently discussed implementation, the distance between vectors may be measured in Euclidean distance. Alternatively, depending on practical situations, the distance between vectors may be measured in other manners such as city block distance, chessboard distance, etc. Herein, it can be assumed that, despite the mechanical vibration and the data fluctuation, the status of the whole system in the scanning of the i-th row of the original scanning data is closest to that in the scanning of the $k_i$-th row of the air data. Therefore, the $k_i$-th row of the air data may be used in the correction of the i-th row of the original scanning data as follows:

$$N(i, j) = \frac{R(i, j) - Z(j)}{F(k_i, j) - Z(j)} \times GAMX \times a + b$$

The above correction method is more reasonable than the correction method using the averaged air data F(j), and is capable of removing striped noise resulted from the latter.

Figure 6:
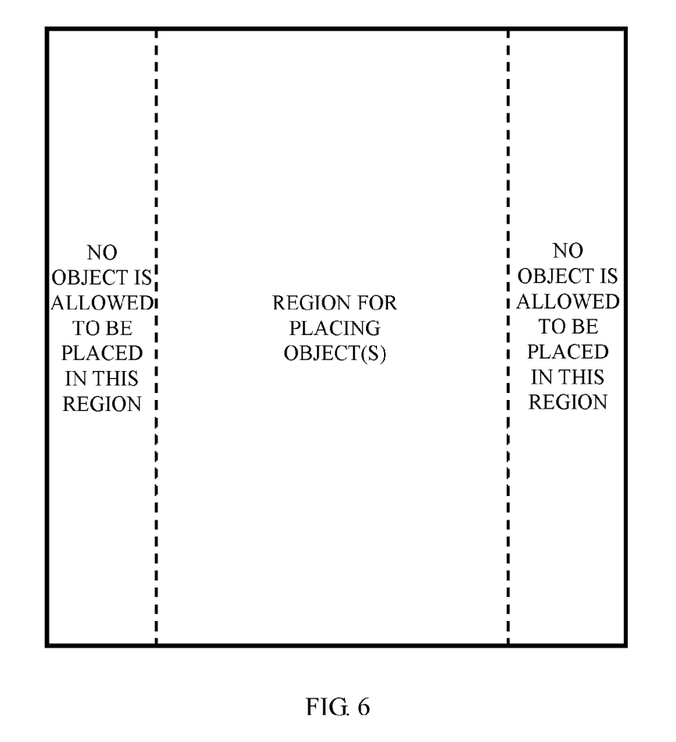
FIG. 6 is an exemplary diagram of a method for restricting a scanning region in accordance with Example 1 of the present invention.

Herein, the size of the set $A_i$ is a factor that influences the correction effect. In order to ensure that $A_i$ comprises a sufficient number of columns, a width of detectable range of the detector may be appropriately increased or the scanning region may be defined to ensure a sufficient size of the air region. For example, certain regions may be marked out at either side or both sides of the scanning tunnels. These regions are also within the scope of scanning and imaging, but it is not allowed to place the object to be scanned or other objects within these regions (as shown in FIG. 6). As such, the image segmentation may be omitted, and the portion of the image corresponding to these regions in which objects are not allowed to be placed may be directly viewed as the air region.

EXAMPLE 2

Figure 7:
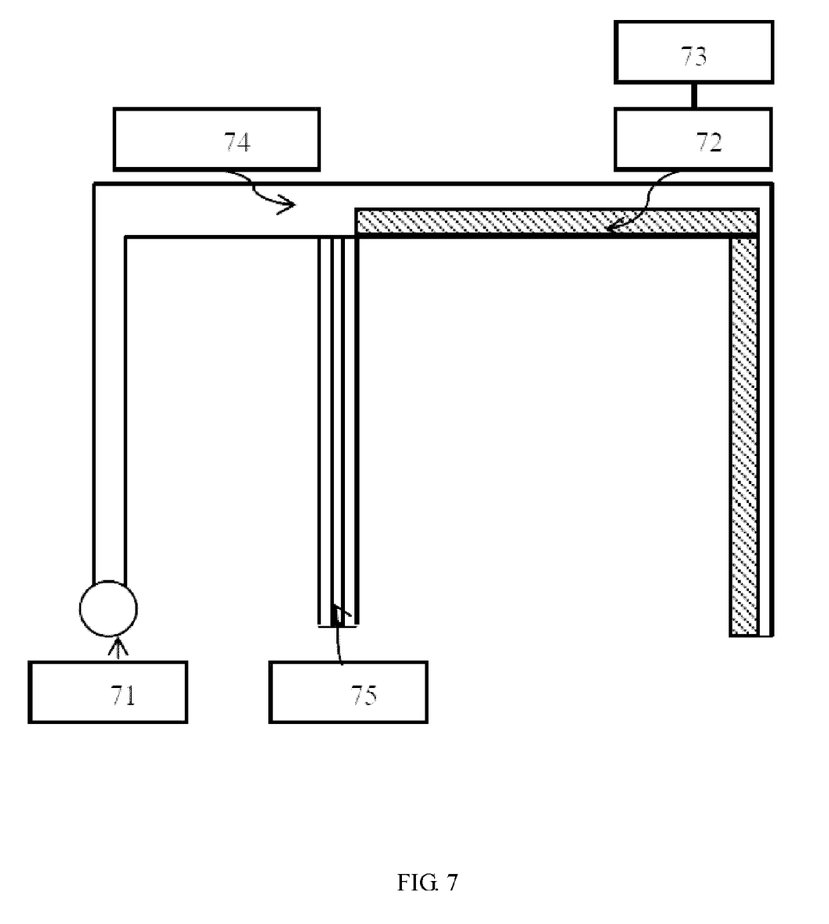
FIG. 7 is a structural diagram of an X-ray scanning system in accordance with Example 2 of the present invention.

Referring to FIG. 7, Example 2 of the present invention provides an X-ray scanning system, which may comprise:
an X-ray generator 71, adapted for emitting X-rays;
a detector 72 that remains stationary relative to the X-ray generator, adapted for collecting detecting signals of the X-rays; and
a processor 73 coupled to the detector 72, adapted for processing the detecting signals of the X-rays that are collected by the detector 72, wherein the processing may comprise:
employing the detecting signals collected by the detector when the X-ray generator emits no X-ray as background data;
employing the detecting signals collected by the detector when the X-ray generator emits the X-rays and there is no object to be scanned in an inspection channel as air data;
employing the detecting signals collected by the detector when the X-ray generator emits the X-rays to scan an object as original scanning data; and
preprocessing the original scanning data according to the background data and the air data to acquire scanned image data.

Further, in order to scan an object to be inspected while the object remains relatively stationary, both the X-ray generator 71 and the detector 72 may be installed on a fixed support 74 and driven by a driving device. Accordingly, the scanning process can be performed in such a way that the X-ray generator 71 and the detector 72 can be moved along a direction vertical to a plane of emitted beams while the X-ray generator 71 remains stationary relative to the detector 72.

In certain implementations, the processor 73 may be further adapted for:
averaging the background data to acquire averaged background data; and/or
averaging the air data to acquire averaged air data.

According to some implementations, the system may also comprises a collimator 75, which is fixed in an optical path between the X-ray generator 71 and the detector 72, wherein the collimator 75 remains stationary relative to both the X-ray generator 71 and the detector 72, adapted for collimating the X-rays emitted by the X-ray generator 71.

In various implementations, the processor 73 may be further adapted for:
segmenting a scanning region into an object region containing therein the object and an air region without the object according to the original scanning data; and
searching the air data for particular air data closest to a value of original scanning data for the air region, and performing a gain correction for the original scanning data according to the background data and the closest air data to acquire the scanned image data.

In other implementations, the processor 73 may be further adapted for segmenting the scanning region into the object region containing therein the object and the air region without the object by using a predefined threshold.

In still other implementations, the processor 73 may be further adapted for segmenting the scanning region into the object region containing therein the object and the air region without the object by using a thresholding method, an edge detection method, or a region growing method.

According to certain implementations, the processor 73 may be further adapted for:

defining a sub-region of the scanning region in which no object is allowed to be placed as the air region, and defining the rest of the scanning region as the object region; and searching the air data for particular air data closest to a value of original scanning data for the air region, and performing a gain correction for the original scanning data according to the background data and the closest air data to acquire the scanned image data.

Figure 8:
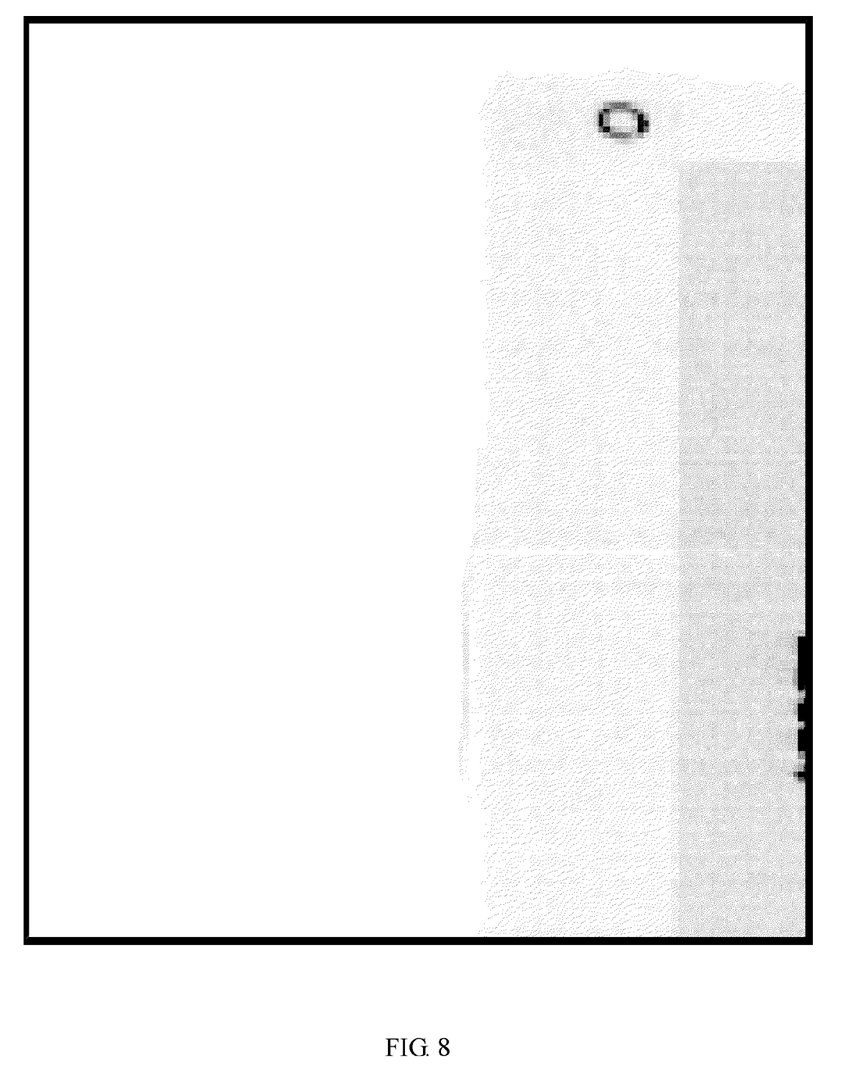
FIG. 8 is an exemplary diagram of a scanned image in accordance with the embodiments of the present invention.

FIG. 8 shows a scanned image obtained after the X-ray scanning and data processing for a static object by the X-ray scanning method and scanning system in accordance with the embodiments of the present invention. As can be clearly seen from a comparison between the images shown in FIG. 8 and FIG. 1, the stripe noise appeared in an empty region on the left side and a scanned object region on the right side of the image of FIG. 1 have been efficiently suppressed and removed from the image of FIG. 8.

As such, when performing an X-ray scanning for a static object, the X-ray scanning methods and scanning systems according to embodiments of the present inventions may measure the background data and the air data and process the scanning data, thereby solving the noise problem caused by the mechanical vibration and thus improving the measurement accuracy.

It should be noted that the illustrative embodiments described herein are merely provided for describing exemplary technical features and/or solutions of the present inventions, but not intended to limit the present inventions. It should be understood by those of ordinary skill in the art that although the present inventions are described as set forth in the illustrative details above with reference to the foregoing embodiments, modifications can be made to the technical solutions described in the foregoing embodiments, or equivalent alternations can be made to some technical features in the technical solutions, without substantially departing from the spirit and scope of the technical solutions of implementations or embodiments of the present inventions.

What is claimed is:

1. An X-ray scanning method, comprising:
   collecting background data when no X-ray is emitted;
   collecting air data when X-rays are emitted and there is no object to be scanned in an inspection channel;
   scanning an object to collect original scanning data; and
   preprocessing the original scanning data according to the background data and the air data to acquire scanned image data,
   wherein the step of preprocessing the original scanning data according to the background data and the air data to acquire scanned image data further comprises:
   segmenting a scanning region into an object region containing therein the object and an air region without the object according to the original scanning data; and
   searching the air data for particular air data closest to a value of original scanning data for the air region, and performing a gain correction for the original scanning data according to the background data and the closest air data to acquire the scanned image data.

2. The X-ray scanning method according to claim 1, wherein the step of collecting the background data further comprises:
   averaging the background data to acquire averaged background data.

3. The X-ray scanning method according to claim 2, wherein the step of collecting the air data further comprises:
   averaging the air data to acquire averaged air data.

4. The X-ray scanning method according to claim 1, wherein the step of segmenting the scanning region into the object region containing therein the object and the air region without the object according to the original scanning data comprises:
   segmenting the scanning region into the object region containing therein the object and the air region without the object by using a predefined threshold.

5. The X-ray scanning method according to claim 1, wherein the step of segmenting the scanning region into the object region containing therein the object and the air region without the object according to the original scanning data comprises:
   segmenting the scanning region into the object region containing therein the object and the air region without the object by using a thresholding method, an edge detection method, or a region growing method.

6. The X-ray scanning method according to claim 1, wherein the step of preprocessing the original scanning data according to the background data and the air data to acquire scanned image data further comprises:
   defining a sub-region of the scanning region in which no object is allowed to be placed as the air region, and defining the rest of the scanning region as the object region; and
   searching the air data for particular air data closest to a value of original scanning data for the air region, and performing a gain correction for the original scanning data according to the background data and the closest air data to acquire the scanned image data.

7. The X-ray scanning method according to claim 1, wherein the step of collecting the air data further comprises:
   averaging the air data to acquire averaged air data.

8. The X-ray scanning method according to claim 2, wherein the step of preprocessing the original scanning data according to the background data and the air data to acquire scanned image data further comprises:
   defining a sub-region of the scanning region in which no object is allowed to be placed as the air region, and defining the rest of the scanning region as the object region; and
   searching the air data for particular air data closest to a value of original scanning data for the air region, and performing a gain correction for the original scanning data according to the background data and the closest air data to acquire the scanned image data.

9. The X-ray scanning method according to claim 3, wherein the step of preprocessing the original scanning data according to the background data and the air data to acquire scanned image data further comprises:
   defining a sub-region of the scanning region in which no object is allowed to be placed as the air region, and defining the rest of the scanning region as the object region; and
   searching the air data for particular air data closest to a value of original scanning data for the air region, and performing a gain correction for the original scanning data according to the background data and the closest air data to acquire the scanned image data.

10. The X-ray scanning method according to claim 9, wherein stripe noise caused by mechanical vibration during the scanning is corrected.

11. The X-ray scanning method according to claim 5, wherein the segmenting is the edge detection method using a first-order derivative and/or a second-order derivative to detect gray level discontinuity of the image data, such that the object region and the air region of the image data may be segmented.

12. An X-ray scanning system, the system comprising:
an X-ray generator, adapted for emitting X-rays;
a detector that remains stationary relative to the X-ray generator, adapted for collecting detecting signals of the X-rays; and
a processor coupled to the detector, adapted for processing the detecting signals of the X-rays that are collected by the detector, said processing comprises:
employing the detecting signals collected by the detector when the X-ray generator emits no X-ray as background data;
employing the detecting signals collected by the detector when the X-ray generator emits the X-rays and there is no object to be scanned in an inspection channel as air data;
employing the detecting signals collected by the detector when the X-ray generator emits the X-rays to scan an object as original scanning data; and
preprocessing the original scanning data according to the background data and the air data to acquire scanned image data,
wherein the processor is further adapted for:
segmenting a scanning region into an object region containing therein the object and an air region without the object according to the original scanning data; and
searching the air data for particular air data closest to a value of original scanning data for the air region, and performing a gain correction for the original scanning data according to the background data and the closest air data to acquire the scanned image data.

13. The X-ray scanning system according to claim 12, wherein the processor is further adapted for:
averaging the background data to acquire averaged background data; and/or
averaging the air data to acquire averaged air data.

14. The X-ray scanning system according to claim 13, further comprising:
a collimator, which is fixed in an optical path between the X-ray generator and the detector, wherein the collimator remains stationary relative to both the X-ray generator and the detector, adapted for collimating the X-rays emitted by the X-ray generator.

15. The X-ray scanning system according to claim 12, wherein the processor is further adapted for:
segmenting the scanning region into the object region containing therein the object and the air region without the object by using a predefined threshold.

16. The X-ray scanning system according to claim 12, wherein the processor is further adapted for:
segmenting the scanning region into the object region containing therein the object and the air region without the object by using a thresholding method, an edge detection method, or a region growing method.

17. The X-ray scanning system according to claim 12, wherein the processor is further adapted for:
defining a sub-region of the scanning region in which no object is allowed to be placed as the air region, and defining the rest of the scanning region as the object region; and
searching the air data for particular air data closest to a value of original scanning data for the air region, and performing a gain correction for the original scanning data according to the background data and the closest air data to acquire the scanned image data.

18. The X-ray scanning system according to claim 16, wherein the segmenting is the edge detection method using a first-order derivative and/or a second-order derivative to detect gray level discontinuity of the image data, such that the object region and the air region of the image data may be segmented.

19. The X-ray scanning system according to claim 12, wherein the X-ray generator and the detector are configured to move in a direction vertical to a plane of emitted X-rays.

20. The X-ray scanning system according to claim 12, wherein stripe noise caused by mechanical vibration during scanning is corrected.

* * * * *